(12) United States Patent
Suzuki

(10) Patent No.: US 12,407,937 B2
(45) Date of Patent: Sep. 2, 2025

(54) IMAGING APPARATUS AND CONTROL METHOD FOR IMAGING APPARATUS

(71) Applicant: CANON KABUSHIKI KAISHA, Tokyo (JP)

(72) Inventor: Misaki Suzuki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 293 days.

(21) Appl. No.: 18/300,673

(22) Filed: Apr. 14, 2023

(65) Prior Publication Data

US 2023/0370725 A1  Nov. 16, 2023

(30) Foreign Application Priority Data

May 11, 2022 (JP) .................................. 2022-078367

(51) Int. Cl.
 *H04N 23/72* (2023.01)
 *H04N 23/63* (2023.01)
 *H04N 23/71* (2023.01)
 *H04N 23/73* (2023.01)

(52) U.S. Cl.
 CPC ........... *H04N 23/72* (2023.01); *H04N 23/631* (2023.01); *H04N 23/71* (2023.01); *H04N 23/73* (2023.01)

(58) Field of Classification Search
 CPC ...... H04N 23/72; H04N 23/631; H04N 23/71; H04N 23/73; H04N 23/82; H04N 23/07
 See application file for complete search history.

(56) References Cited

U.S. PATENT DOCUMENTS

| 7,312,795 B2 | 12/2007 | Aso et al. | |
| 2017/0345392 A1* | 11/2017 | Matsubayashi | H04N 23/741 |
| 2019/0238737 A1* | 8/2019 | Matsuno | H04N 23/611 |

FOREIGN PATENT DOCUMENTS

JP  2015-166767 A  9/2015

\* cited by examiner

*Primary Examiner* — Sinh Tran
*Assistant Examiner* — Angel L Garces-Rivera
(74) *Attorney, Agent, or Firm* — Venable LLP

(57) ABSTRACT

An imaging apparatus includes at least one memory and at least one processor which function as: an acquisition unit configured to acquire a representative brightness of a high brightness region of an image; a setting unit configured to set a target brightness of the high brightness region, based on a display brightness of a display device that displays the image; and an exposure control unit configured to control exposure based on the representative brightness and the target brightness of the high brightness region.

13 Claims, 9 Drawing Sheets

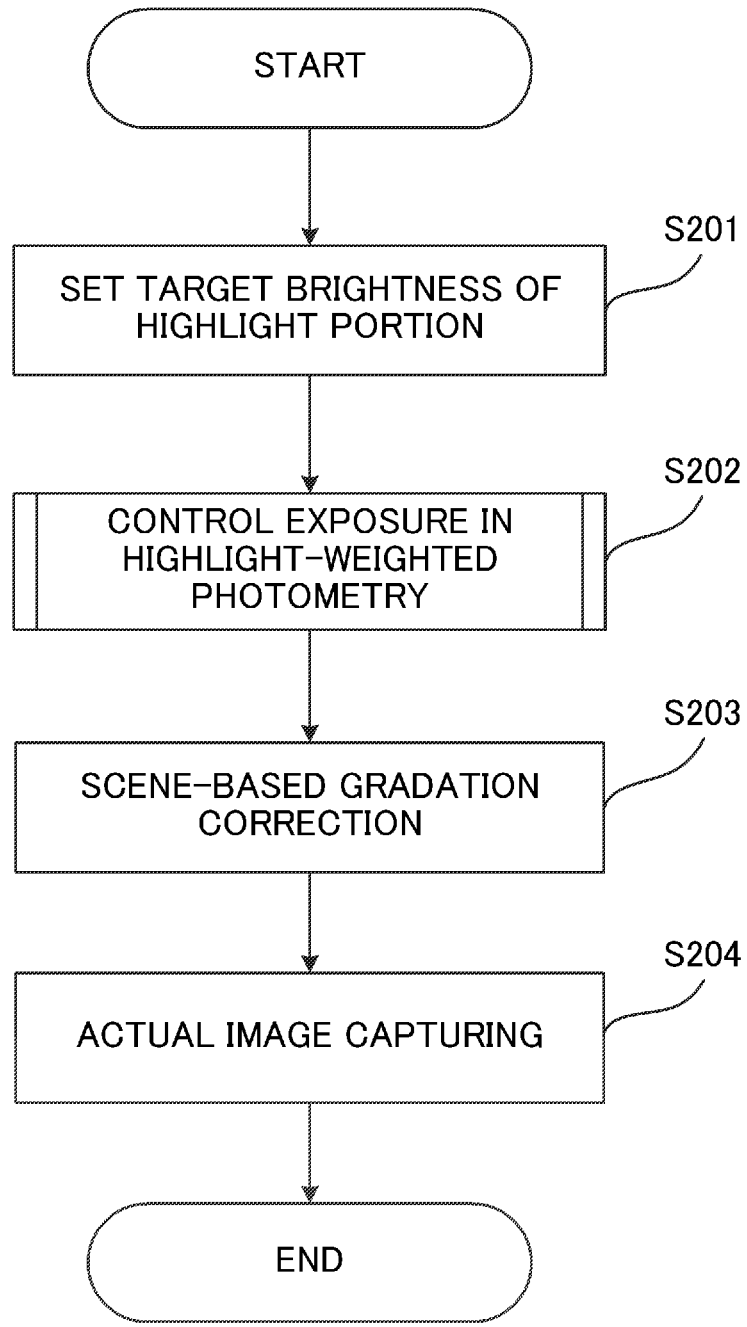

HIGHLIGHT PORTION

HIGHLIGHT PORTION cd/m²

| USER SPECIFIED BRIGHTNESS (TH) | 400 | 600 | 1000 |
|---|---|---|---|
| BRIGHTNESS CHANGE AMOUNT ($\alpha$) | 10 | 50 | 100 |

IMAGING APPARATUS AND CONTROL METHOD FOR IMAGING APPARATUS

BACKGROUND OF THE INVENTION

Field of the Invention

The present invention relates to an imaging apparatus and a control method for the imaging apparatus.

Description of the Related Art

As a display technique to display an image on a monitor or a display in a standard dynamic range, SDR (Standard Dynamic Range) is known. However in the case of HDR (High Dynamic Range), which is a display technique that allows expressing images having a wider dynamic range than SDR, brightness differences and colors, which are difficult to express in SDR, can be expressed.

In the case of capturing an HDR image, a highlight-weighted photometric method, which performs photometry focusing on a high brightness region on the screen, is known as a photometric method of an imaging apparatus. If the highlight-weighted photometric method is used, white clipping is reduced by automatically performing photometry for a bright portion on the screen.

Japanese Patent Application Publication No. 2015-166767 discloses a technique that, in a scene where high brightness light exists in addition to a main object on a screen, exposure is controlled appropriately without the influence of the high brightness light.

Display brightness of the display device that displays an HDR image varies. Therefore even if a high brightness portion (hereafter highlight portion) or a region including an object in an image is captured at a target brightness, it may be difficult to display the image at a brightness intended by a user, depending on the brightness performance of the display device.

SUMMARY OF THE INVENTION

It is an object of the present invention to provide an imaging apparatus that allows brightness expression that utilizes the display brightness of the display device by controlling exposure considering the brightness performance of the display device.

An imaging apparatus of the present invention includes at least one memory and at least one processor which function as: an acquisition unit configured to acquire a representative brightness of a high brightness region of an image; a setting unit configured to set a target brightness of the high brightness region, based on a display brightness of a display device that displays the image; and an exposure control unit configured to control exposure based on the representative brightness and the target brightness of the high brightness region.

Further features of the present invention will become apparent from the following description of exemplary embodiments with reference to the attached drawings.

BRIEF DESCRIPTION OF THE DRAWINGS

FIG. 2 is a flow chart exemplifying image capturing processing using highlight-weighted photometry;

DESCRIPTION OF THE EMBODIMENTS

Embodiments of the present invention will be described with reference to the drawings. Embodiments to be described below are examples of implementing the present invention, and may be modified or changed when necessary, depending on the configuration and various conditions of an apparatus to which the present invention is applied. Each of the embodiments may be combined when necessary.

Figure 1:
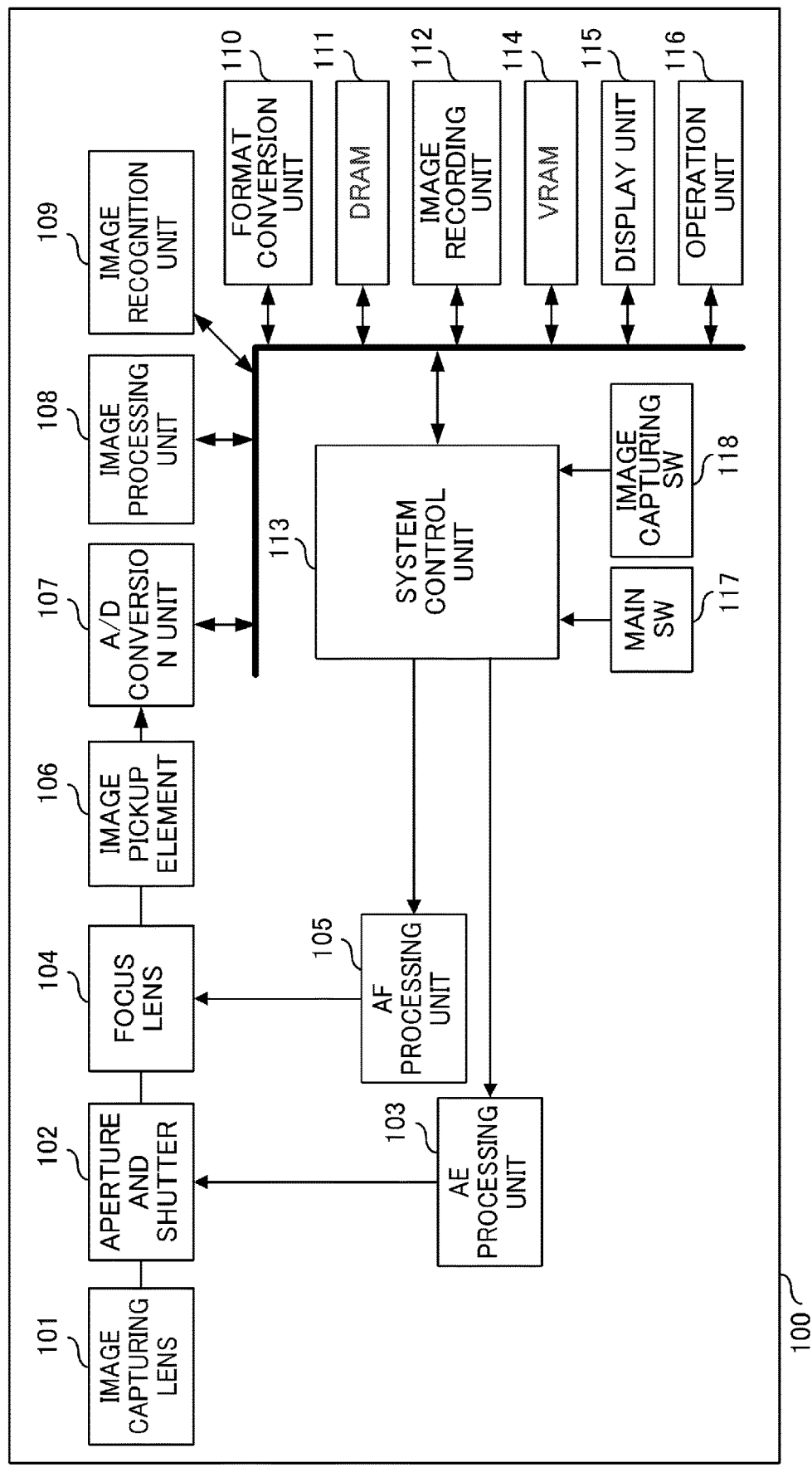
FIG. 1 is a block diagram exemplifying a configuration of a digital camera.

(Configuration of Digital Camera) FIG. 1 is a block diagram exemplifying a configuration of a digital camera 100, which is an imaging apparatus according to an embodiment of the present invention. As an imaging mechanism, the digital camera 100 includes an image capturing lens 101, an aperture/shutter 102, an automatic exposure (AE) processing unit 103, a focus lens 104, an auto focus (AF) processing unit 105, an image pickup element 106, and an A/D conversion unit 107.

The image capturing lens 101 includes a zoom mechanism. The aperture/shutter 102 controls the incident light quantity of an incident light (reflected light from an object) to the image pickup element 106, and the charge storage time in accordance with the instruction from the AE processing unit 103. The AE processing unit 103 performs photometry for a photometric region in accordance with a photometric mode, and controls exposure by controlling operation of the aperture/shutter 102 based thereon. The AE processing unit 103 also controls the A/D conversion unit 107. The focus lens 104 forms an optical image focusing on a light-receiving surface of the image pickup element 106 in accordance with a control signal from the AF processing unit 105. The AF processing unit 105 calculates distance from the digital camera 100 to the object.

The image pickup element 106 converts the optical image formed on the light-receiving surface into electric signals using such photoelectric conversion means as a CCD element or a CMOS element, and outputs the electric signals to the A/D conversion unit 107. The A/D conversion unit 107 converts the received electric signals (analog signals) into digital signals (RAW signals). The A/D conversion unit 107 includes a CDS circuit that removes noise from the received electric signals and a non-linear amplification circuit to perform non-linear amplification on the received electric signals before being converted into RAW signals.

The digital camera 100 also includes an image processing unit 108, an image recognition unit 109, a format conversion unit 110, and a dynamic RAM (DRAM) 111. The image processing unit 108 performs developing processing, where a predetermined pixel interpolation, resize processing (e.g. reducing an image), and color conversion processing are performed on the RAW signals inputted from the A/D conversion unit 107, and the image data is outputted.

The image processing unit 108 has a gamma function that converts a signal level of the RAW signal inputted from the A/D conversion unit 107 in accordance with the magnitude of the original signal level. The A/D conversion unit 107 can also convert an analog signal generated by being converted by the gamma function into a RAW signal.

The image processing unit 108 adjusts an image quality of the captured image by performing the gradation correction (e.g. adjusting the brightness level of the image). The image processing unit 108 can perform the gradation correction in accordance with the scene based on the recognition result by the image recognition unit 109.

The image recognition unit 109 receives input of the image data which has been appropriately processed by the image processing unit 108. The image recognition unit 109 includes a photometric function, and can measure brightness of the inputted image. The AE processing unit 103 implements the exposure control based on the photometric result by the image recognition unit 109.

The image recognition unit 109 can recognize a scene using a known technique. For example, the image recognition unit 109 detects a face of a person (object), and recognizes that this is a scene of capturing an image of a person. Further, the image recognition unit 109 can acquire an information on a dynamic range of the image capturing scene. The photometric result and the scene recognition information acquired by the image recognition unit 109 are outputted to the AE processing unit 103.

The format conversion unit 110 converts the format of the image data generated by the image processing unit 108 in order to store the image data to the DRAM 111. The DRAM 111 is an internal memory, and is used as a buffer to temporarily store image data, or as a work memory to perform compression/decompression processing of the image data, for example.

The digital camera 100 includes an image recording unit 112, system control unit 113, a video RAM (VRAM) 114, a display unit 115, an operation unit 116, a main switch (main SW) 117, and an image capturing switch (image capturing SW) 118. The image recording unit 112 includes a recording medium, such as a memory card, to record captured images (still images, moving images), and an interface thereof.

The system control unit 113 includes a CPU (processor), a ROM and a RAM. The CPU controls the general operation of the digital camera 100 by developing the programs stored in the ROM in the work area of the RAM, and executing the programs. The system control unit 113 can implement the processing of each component of the digital camera 100 by executing the programs stored in the ROM. The system control unit 113 controls which mode is used, out of the plurality of imaging driving modes of the image pickup element 106. The VRAM 114 is a memory for image display.

The display unit 115 is a liquid crystal display (LCD), for example. The display unit 115 displays an image, displays information to assist operation, and displays the state of the digital camera 100, and when an image is captured, the display unit 115 also displays the image capturing screen and a distance measuring region.

The operation unit 116 is a member for a user to operate the digital camera 100 externally. Using the operation unit 116, the user can perform various settings, such as settings for exposure correction, aperture value and image reproduction. The operation unit 116 includes a menu switch, a zoom lever to instruct zoom operation of the image capturing lens, and an operation mode selecting switch to switch between an image capturing mode and an image reproduction mode, and the like.

The main switch 117 is a switch to turn the power of the digital camera 100 ON. The image capturing switch 118 is a switch to perform a two-step operation in accordance with the pushing depth of the switch. By a half depressed operation (SW1 operation), where the image capturing switch 118 is pushed in half way, the system control unit 113 executes an image preparation operation, such as AE processing and AF processing. By a fully depressing operation (SW2 operation), where the image capturing switch 118 is completely pushed in, the system control unit 113 executes image capturing processing.

A series of processing executed by the digital camera 100 will be described. When power is turned ON by pressing the main switch 117, the system control unit 113 of the digital camera 100 executes the imaging processing at a predetermined cycle (e.g. 33 ms cycle) using the image pickup element 106. The digital camera 100 then enters an image capturing standby state, where a captured image is sequentially displayed on the display unit 115.

When an image capturing instruction, performed by pressing the image capturing switch 118 (SW2 operation), is received, the system control unit 113 executes the actual image capturing processing using the image pickup element 106. The system control unit 113 executes the image processing on the captured image using the image processing unit 108, and records the image data after the image processing in the image recording unit 112. The digital camera 100 returns to the actual image capturing standby state again. When the main switch 117 is pressed again, power of the digital camera 100 is shut OFF.

Now the brightness performance of the display device (display unit 115) will be described. As a standard of an HDR display device, the Video Electronics Standards Association (VESA) in the USA established the Display HDR standard. Display HDR standardizes the performance related to HDR (e.g. brightness, contrast ratio) of display apparatuses grading by levels. For example, "Display HDR 400", "Display HDR 600", and "Display HDR 1000" are specified as display devices that can perform high brightness display of 400 $cd/m^2$, 600 $cd/m^2$ and 1000 $cd/m^2$ respectively. Thus the display brightness of each display device that displays the HDR image varies.

The signal characteristic to indicate the relationship between the image signal level and the display brightness in HDR is specified by the electro-optical transfer function (EOTF). There are two types of EOTF: the perceptual quantization (PQ) standardized as SMPTE ST 2084; and the hybrid log gamma (HLG) standardized as ARIB STD-B67. While the HLG system handles the display brightness as relative values, the PQ system handles the display brightness as absolute values of a maximum of 10000 $cd/m^2$ (or nits), which is different from the HLG system.

In the case of the PQ system, the peak brightness is defined as the absolute value, hence display is possible at a predetermined brightness, and reproducibility is higher than the HLG system, where the peak brightness changes depending on the display device. On the other hand, in the case of the PQ system, the brightness expression in accordance with the display brightness of the display device may become difficult.

For example, a display device of "Display HDR 400" has the peak brightness of 400 $cd/m^2$. Therefore if the HDR image is captured by the highlight-weighted photometry so that the highlight portion becomes 600 $cd/m^2$, the display device of "Display HDR 400" clips (rounds down) the 400 cd/m² or higher signal values, so as to display the portion as white.

The display device of "Display HDR 1000" can express images up to 1000 cd/m². If the HDR image is captured by the highlight-weighted photometry so that the highlight portion becomes 400 cd/m², the display device of "Display HDR 1000" hardly uses the regions of 400 cd/m² to 1000 cd/m². In this case, the displayed image becomes an image where the brightness performance of the display device of "Display HDR 1000" is not sufficiently expressed.

(Flow of Image Capturing Processing by Highlight-Focused Photometry) A flow of image capturing processing by the highlight-weighted photometry will be described with reference to FIG. 2. FIG. 2 is a flow chart exemplifying the image capturing processing by the highlight-weighted photometry.

In step S201, the system control unit 113 sets a target brightness of a highlight portion. The highlight portion is a region in the image where the brightness is relatively high, and is also called a "high brightness region". The target brightness is a target value to determine the brightness of the highlight portion used in the image capturing. The system control unit 113 can set the target brightness based on the instruction from the user via the operation unit 116 (selection operation, input operation, or the like).

The user sets the target brightness considering the display brightness of the display device. By setting the target brightness to the display brightness of the display device, the user can express the brightness utilizing the display brightness of the display device. The display device here may be an external device connected to the digital camera 100, or may be the display unit 115 included in the digital camera 100. From the display device on which the captured image is displayed, the system control unit 113 may acquire the information on the display brightness of this display device, and set the acquired display brightness as the target brightness.

In step S202, the system control unit 113 performs photometry based on the target brightness which was set in step S201, and controls the exposure in the highlight-weighted photometry. The system control unit 113 converts the target brightness, which was determined in step S201, into a signal value before the A/D conversion, using the image processing unit 108, and outputs the signal value to the AE processing unit 103.

The system control unit 113 measures the brightness of the highlight portion using the image processing unit 108 and the image recognition unit 109. Further, the image processing unit 108 converts the brightness of the highlight portion into a signal value before the A/D conversion, and outputs the signal value to the AE processing unit 103. The AE processing unit 103 determines the number of exposure steps between the target brightness and the brightness of the highlight portion, and determines the exposure by controlling the operation of the aperture/shutter 102. The exposure control processing by the AE processing unit 103 will be described later in detail with reference to FIG. 8.

In step S203, the system control unit 113 performs the scene-based gradation correction processing. Using the image processing unit 108, the system control unit 113 performs the gradation correction processing on an image captured at the exposure determined in step S202. The scene-based gradation correction processing is processing to correct a tone curve based on the dynamic range and the target brightness of the image.

In step S204, the system control unit 113 executes the actual image capturing processing. The system control unit 113 executes the image processing on the captured image using the image processing unit 108, and records the processed image data in the image recording unit 112.

(Setting of Target Brightness) Setting of the target brightness of the highlight portion in step S201 in FIG. 2 will be described in detail. The AE processing unit 103 controls the exposure such that the brightness of the highlight portion becomes close to the target brightness which was set in step S201. The highlight portion is a region where brightness is relatively high in the image. The brightness of the highlight portion is a representative brightness determined based on the brightness of the pixels included in the highlight portion (hereafter called "representative brightness").

First the representative brightness of the highlight portion will be described with reference to FIGS. 3A and 3B to FIGS. 5A and 5B. The representative brightness of the highlight portion can be determined using various methods. For example, the representative brightness of the highlight portion is determined based on the brightness histograms of the image (hereafter "histograms") indicated in FIGS. 3A and 3B. The vertical axis of the histogram indicates a number of pixels, and the horizontal axis thereof indicates a brightness.

Figure 3A:
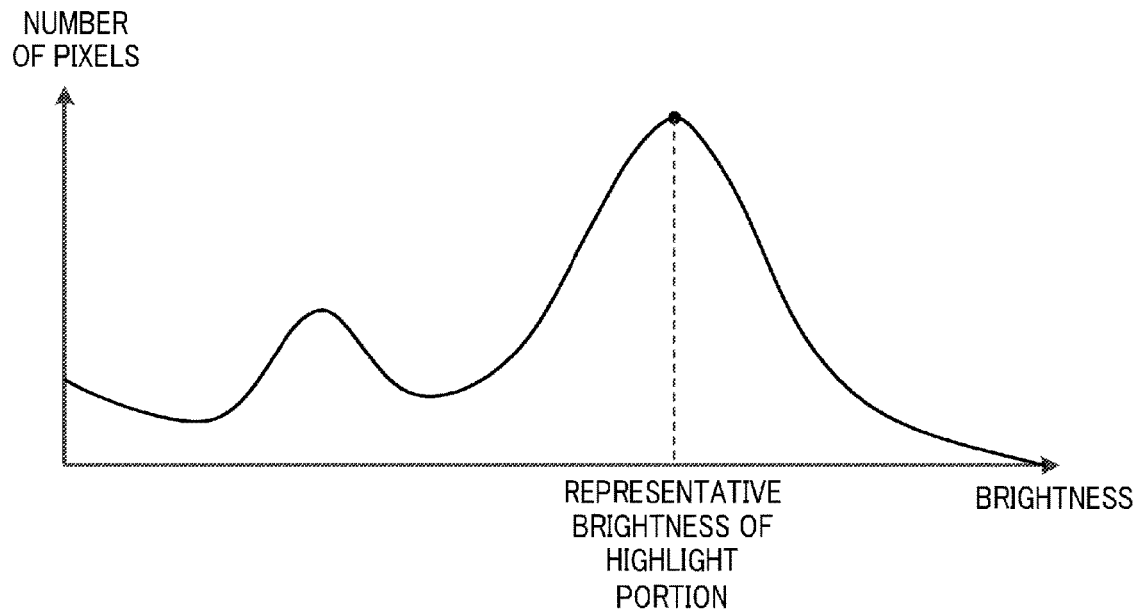
FIGS. 3A and 3B are diagrams for describing a representative brightness of a highlight portion.

FIG. 3A is an example where the representative brightness of the highlight portion is the brightness at the position of the peak (relative maximum value) of the bell shape of the histogram on the higher brightness side. The representative brightness of the highlight portion may also be a brightness at the center-of-gravity position of the bell shape on the higher brightness side (region of a protruded portion of the histogram on the higher brightness side). The bell shape on the higher brightness side is a region surrounded by the range from the edge of the histogram on the higher brightness side to the relative minimum value and the coordinate axis of the corresponding brightness, for example. The bell shape in the histogram may be determined in a range including a peak at which a number of pixels is maximum, and may be a region between relative minimum values on both sides of the peak, for example.

Figure 3B:
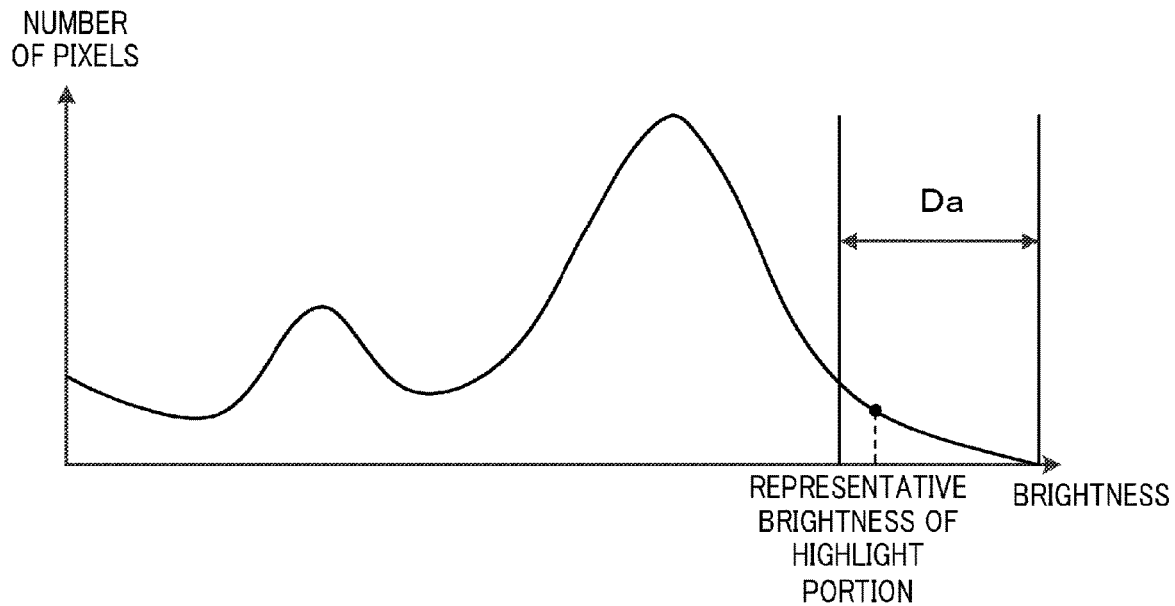

FIG. 3B is an example where the representative brightness of the highlight portion is a mean value of the brightness of the pixels included in the brightness range Da, in which the cumulative frequency in the histogram from the higher brightness side is a predetermined ratio (e.g. 5%) or less. The representative brightness of the highlight portion may be the brightness of the center-of-gravity position of a region, in which the cumulative frequency in the histogram from the higher brightness side is the predetermined ratio or less. The predetermined ratio is preferably at least 1% and not more than 10%.

A region for which the histogram is acquired may be an entire image, or an inner region of the image excluding the periphery thereof. For example, the system control unit 113 may generate a histogram for a predetermined ratio (e.g. 80%) of the inner region of the image.

The reason why the brightness histogram is generated for the region excluding the periphery of the image will be described. In the periphery region of the image, the brightness tends to be lower, since the light quantity is lower in the periphery of the lens. Therefore the histogram of the peripheral region of the image is shifted to the lower brightness side, and cannot be detected appropriately. Hence it is preferable that the peripheral region of the image is not included in the detection range.

Further, it is likely that an object does not exist in the peripheral region of the image, and the user does not focus on a region if an object does not exist, hence the peripheral region is preferably not included in the detection range. Moreover, in some cases, a still image and a moving image are captured in a same scene, so that the effects of the gradation correction thereof become similar. The aspect ratio of an image is 3:2 or 4:3 in a still image, and is 16:9 or the like in a moving image, and by excluding the upper and lower edges of the of the still image, the effects of the gradation correction in the still image and the moving image can be similar.

Figure 4:
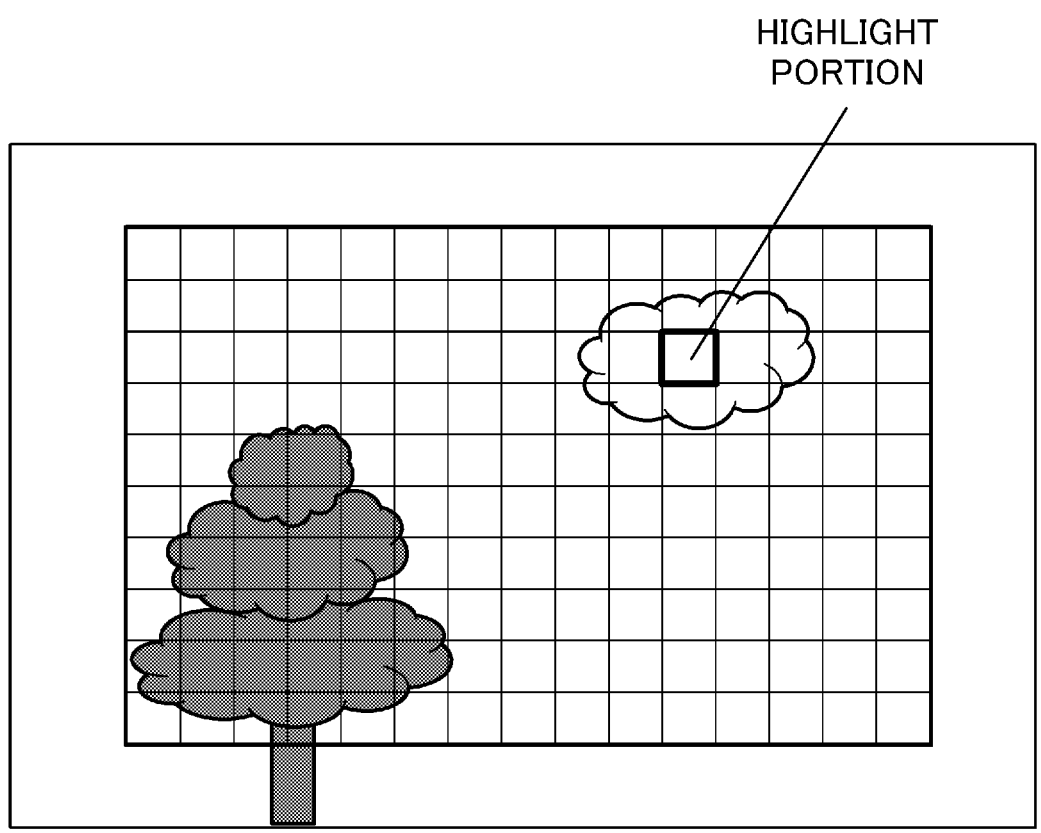
FIG. 4 is a diagram depicting an example to determine a highlight portion by screen division.

FIG. 4 is an example of determining a highlight portion by screen division. Here the image is divided into a plurality of blocks, and a block, of which mean value of the brightness in the block is highest, for example, can be a highlight portion. The highlight portion may be a block of which mean value, maximum value, minimum value, median value or mode value of the brightness in the block (hereafter block brightness) is the highest.

In the example in FIG. 4, 80% of the region inside the image is divided into a plurality of blocks. A cloud and a tree are captured in the image, and the highlight portion is determined to be a block of which block brightness is highest in the region of the cloud. The representative brightness of the highlight portion may be a block brightness of the block determined as the highlight portion.

Figure 5A:
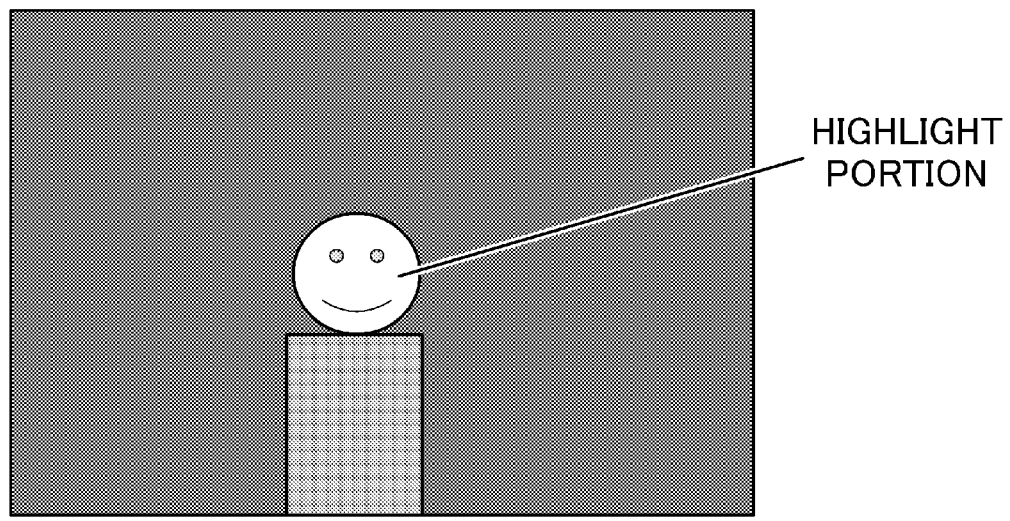
FIGS. 5A and 5B are diagrams for describing an example of determining a highlight portion by detecting an object.
Figure 5B:
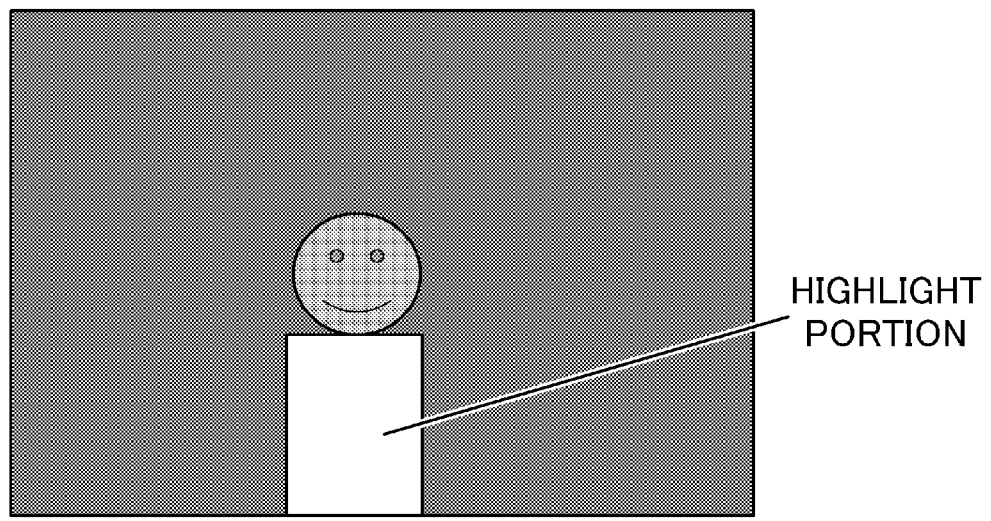

FIGS. 5A and 5B are diagrams for describing an example of detecting an object and determining a highlight portion thereof. The highlight portion may be determined by the image recognition unit 109 based on the brightness of the object, such as a face of a person or an animal detected in the image, for example.

FIGS. 5A and 5B are examples when a face and a body of a person are detected as an object. As for a brightness of the face, the system control unit 113 acquires an average brightness in a rectangle enclosing all or a part of the face of the person. The system control unit 113 also acquires the brightness of the body in the same manner as the case of the face of the person. The brightness of the face and the brightness of the body are not limited to a mean value of the brightness of each rectangle, but may be a maximum value, a minimum value, a median value, a mode value, or the like of the brightness in the rectangle.

In FIG. 5A, the brightness of the face is higher than the brightness of the body, hence the highlight portion is determined to be the region of the face. In this case, the representative brightness of the highlight portion is the brightness of the face. In FIG. 5B, the brightness of the body is higher than the brightness of the face, therefore the highlight portion can be the region of the body. In this case, the representative brightness of the highlight portion is the brightness of the body. In this way, the system control unit 113 acquires brightness of a plurality of regions included in the object, and determines a region of which brightness is highest as a highlight portion, whereby the representative brightness is acquired.

The target brightness will be described next. In the case of performing the highlight-weighted photometry, the system control unit 113 controls the exposure such that the representative brightness of the highlight portion becomes close to the target brightness. The target brightness that is set is specified by the user in accordance with the display brightness of the display device.

Figure 6A:
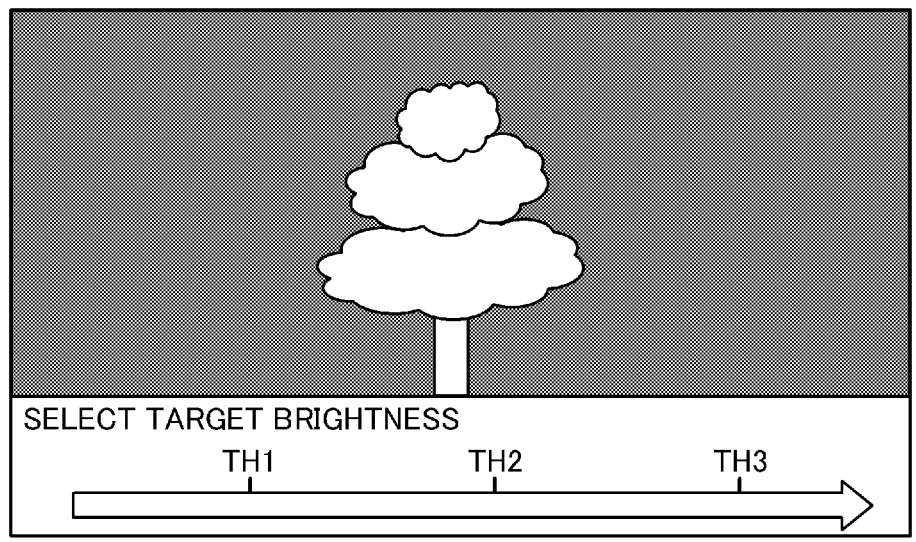
FIGS. 6A and 6B are screen examples for a user to specify a target brightness.

A screen for the user to specify the target brightness will be described with reference to FIGS. 6A and 6B. FIG. 6A is an example of a screen where the user specifies the target brightness by selecting one of the predetermined brightness TH1, TH2 and TH3. In the case of capturing and displaying an HDR image having an absolute brightness, as in the case of the PQ system, TH1 is 400 cd/m$^2$, TH2 is 600 cd/m$^2$, and TH3 is 1000 cd/m$^2$, for example, in accordance with the Display HDR standard.

Figure 6B:
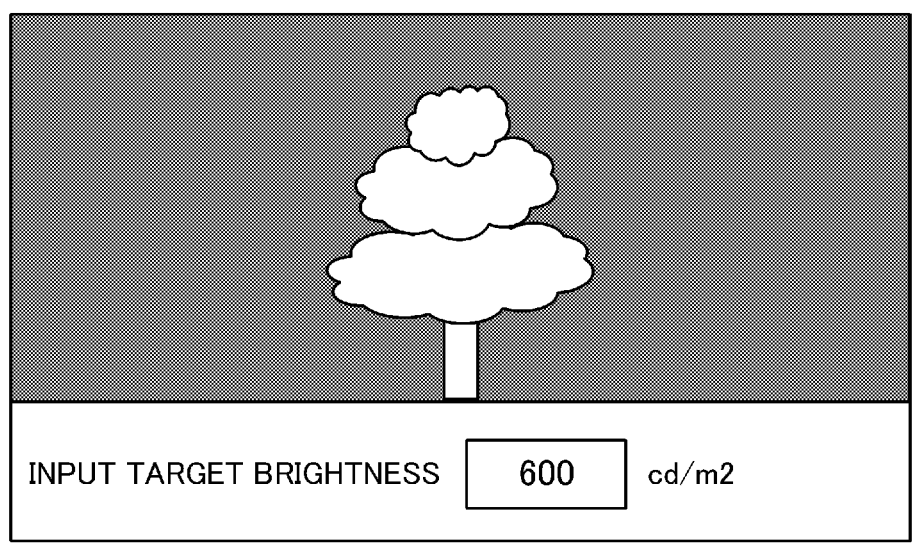

FIG. 6B is an example of a screen where the user specifies the target brightness by numerically inputting the target brightness value. The system control unit 113 may set a user specified brightness TH, which the user specified on the screen in FIG. 6B, as the target brightness, or the system control unit 113 may adjust (change) the target brightness by performing a predetermined arithmetic operation on the user specified brightness TH. In the following, a case of applying the predetermined arithmetic operation on the user specified brightness TH will be described, but the predetermined arithmetic operation may be applied to a display brightness of the display device acquired from the display device.

The predetermined arithmetic operation is processing to increase/decrease a predetermined brightness value from the user specified brightness TH, for example. The target brightness TargetLum is given by the following (Formula 1), where α is the brightness change amount from the user specified brightness TH.

$$\text{TargetLum} = TH - \alpha \quad \text{(Formula 1)}$$

In the case of α>0, the target brightness is set to be lower than the user specified brightness TH, and in the case of α<0, the target brightness is set to be higher than the user specified brightness TH. For example, in the case where the user specified brightness TH is 400 cd/m$^2$ and the brightness change amount α is 20 cd/m$^2$, the target brightness is set to 380 cd/m$^2$.

Figures 7, 8:
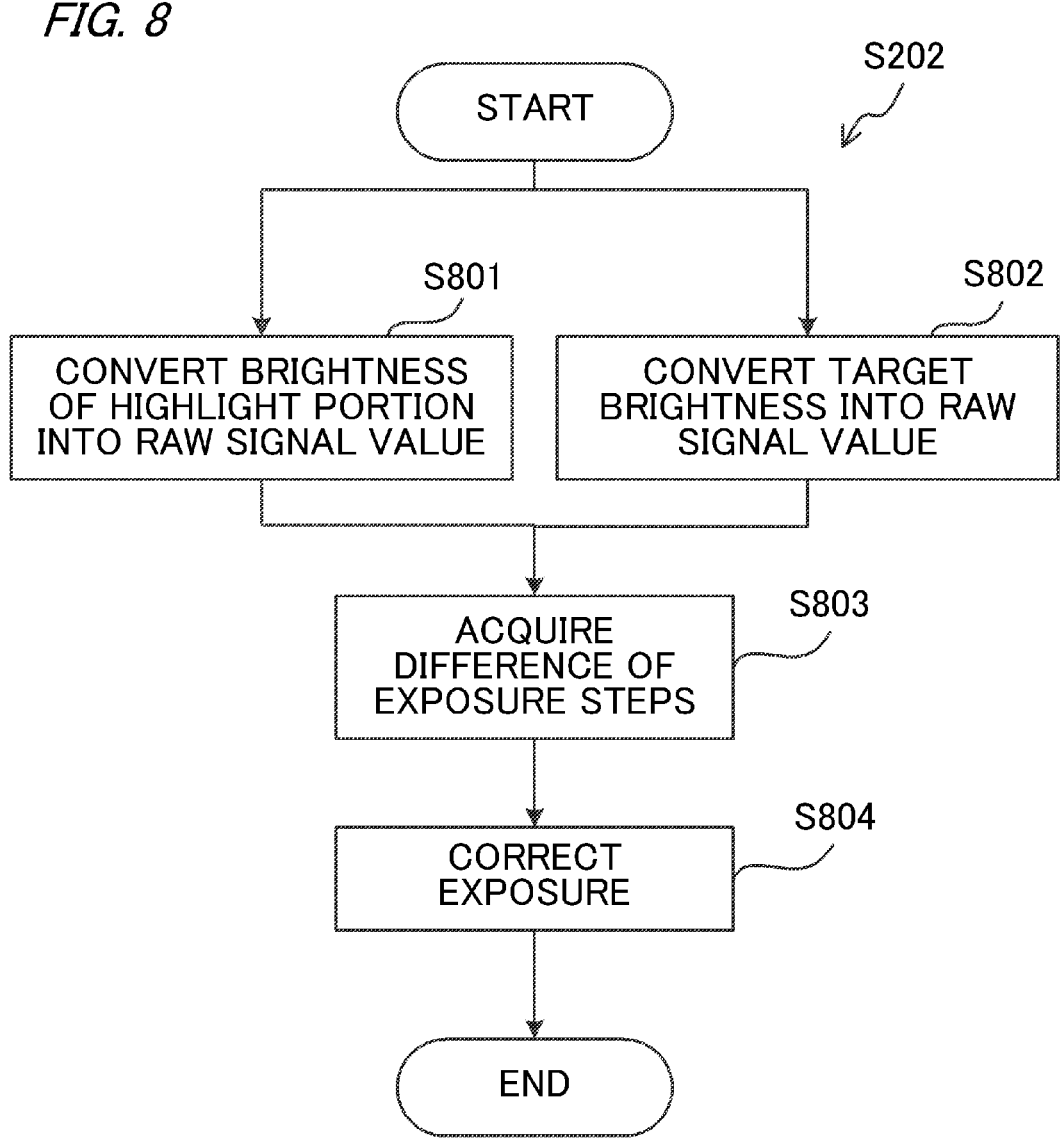
FIG. 7 is an example of a lookup table to determine a brightness change amount.
FIG. 8 is a flow chart exemplifying exposure control processing.

The predetermined arithmetic operation may be processing to increase/decrease the brightness change amount α, which changes in accordance with the user specified brightness TH, from the user specified brightness TH. FIG. 7 is an example of a lookup table to determine the brightness change amount α based on the user specified brightness TH. By providing the lookup table in advance, the system control unit 113 can change the brightness change amount α in accordance with the user specified brightness TH.

When the user specified brightness TH is set based on the display brightness of the display device, and the brightness change amount α is changed thereby, the target brightness is set to a brightness in accordance with the display brightness of the display device. In other words, the brightness change amount α of the lookup table may be set to a value in accordance with the display brightness of the display device.

In the example in FIG. 7, if the user specified brightness TH is 400 cd/m$^2$, 600 cd/m$^2$ and 1000 cd/m$^2$, the brightness change amounts α thereof are 10 cd/m$^2$, 50 cd/m$^2$ and 100 cd/m$^2$ respectively. The lookup table in FIG. 7 is a table based on the assumption that the user selects a target brightness out of the predetermined brightness values, as indicated in FIG. 6A. In the case where the user inputs a target brightness value, as indicated in FIG. 6B, the lookup table can be a table for determining a brightness change amount α for each inputted brightness value (user specified brightness TH).

The method for changing the brightness change amount α in accordance with the user specified brightness TH is not limited to the method of using the lookup table, but may be a method of using a function Rate (TH), which uniquely determines the brightness change amount α in accordance with the user specified brightness TH. The target brightness TargetLum is given by the following (Formula 2).

$$\text{TargetLum} = TH - \text{Rate}(TH) \quad \text{(Formula 2)}$$

The function Rate (TH) can be a function to multiply the user specified brightness TH by a predetermined coefficient, for example.

(Exposure Control) The exposure control in the highlight-weighted photometry in step S202 in FIG. 2 will be described with reference to FIG. 8. FIG. 8 is a flow chart exemplifying the exposure control processing.

In step S801, the system control unit 113 converts the representative brightness of the highlight portion into RAW signal value Ya. The RAW signal value is a signal value before gamma processing after A/D conversion processing was performed, and can be uniquely determined based on the set value of the gamma function.

In step S802, the system control unit 113 converts the target brightness, which was set in step S201, into the RAW signal value Yb, just like step S801. In step S803, the system control unit 113 acquires a difference in the number of exposure steps. The difference in the number of exposure steps can be determined as Log (Ya/Yb) using a known arithmetic operation. In step S804, the system control unit 113 corrects exposure using the difference in the number of exposure steps acquired in step S803, such that the representative brightness of the highlight portion becomes closer to the target brightness.

Figure 9A:
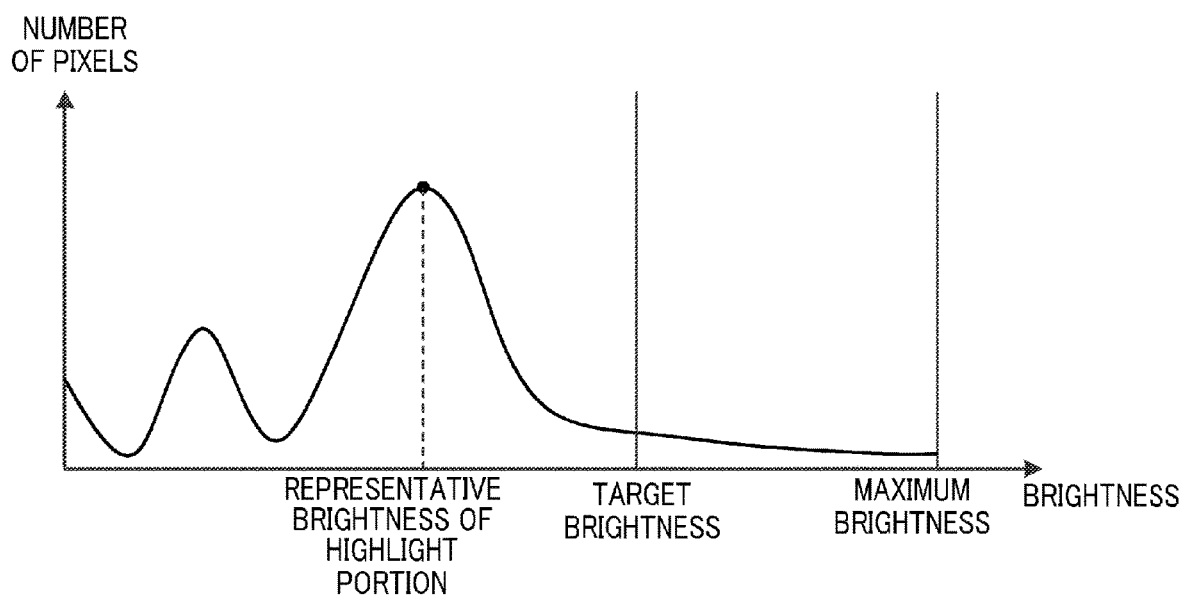
FIGS. 9A and 9B are diagrams exemplifying histograms before and after exposure correction.

The change of the histogram before and after correcting the exposure will be described next with reference to FIGS. 9A and 9B. FIG. 9A is an example of a histogram of the image before correcting the exposure. The representative brightness of the highlight portion is the brightness at the peak of the first bell shape of the histogram on the higher brightness side. The representative brightness of the highlight portion is on the lower brightness side of the target brightness. The distribution of the pixels on the higher brightness side is low, and the image before correcting the exposure is an image that is generally darker than the target brightness.

Figure 9B:
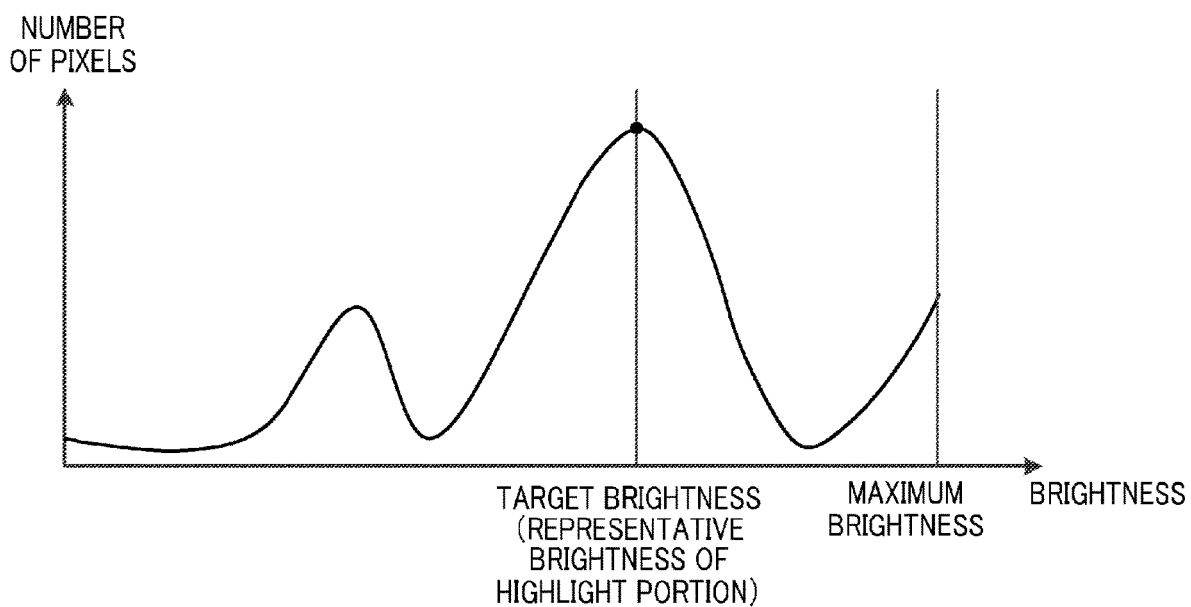

FIG. 9B is a histogram after correcting the exposure of the histogram indicated in FIG. 9A. The system control unit 113 corrects the exposure such that the representative brightness of the highlight portion shifts to the higher brightness side of the histogram by the difference in the number of exposure steps acquired in step S803. Thereby the representative brightness of the highlight portion after correcting the exposure approximately matches with the target brightness. The distribution of the histogram generally shifts to the higher brightness side, and the image after correcting the exposure becomes brighter than the image before correcting the exposure.

FIGS. 9A and 9B indicate examples of correction to increase the exposure when the representative brightness of the highlight portion is lower than the target brightness, but in the case where the representative brightness of the highlight portion is higher than the target brightness, the system control unit 113 may decrease the exposure to make the representative brightness of the highlight portion closer to the target brightness.

(Scene-Based Gradation Correction Processing) A scene-based gradation correction processing in step S203 in FIG. 2 will be described. In step S202, the exposure is controlled such that the representative brightness of the highlight portion becomes close to the target brightness, but in a case where the dynamic range of an image capturing scene has a predetermined number of steps or more, the acquired image may become darker than expected, and becomes an image that is not desirable due to white clipping or black clipping, for example. Therefore in step S203, if the dynamic range of an image capturing scene has a predetermined number of steps or more, the system control unit 113 performs the gradation correction so that the dark portion (low brightness region) after excluding the highlight portion (high brightness region) becomes brighter.

The dynamic range of an image capturing scene is a range of the brightness difference (difference between the maximum brightness and the minimum brightness) of the image capturing scene, and is expressed by a number of steps of an EV value or the like, which increases in steps in accordance with the width of the dynamic range. The number of steps may be 8 to 12 steps, for example, but may be set to other step numbers in accordance with the image quality desired by the user.

The gradation correction processing, in a case of capturing a scene where the dynamic range has 15 steps, the maximum brightness is 5000 $cd/m^2$, and the representative brightness of the highlight portion is 4500 $cd/m^2$, will be described. If the target brightness is set to 400 $cd/m^2$, the system control unit 113 controls the exposure such that the representative brightness 4500 $cd/m^2$ of the highlight portion becomes close to 400 $cd/m^2$, which is lower than the actual brightness. By decreasing the exposure, the image after correcting the exposure becomes darker than the image before correcting the exposure, and the gradation property in the dark portion deteriorates.

In the case where the gradation property in the dark portion deteriorates by setting the target brightness to 400 $cd/m^2$, the system control unit 113 performs the gradation correction such that the dark portion becomes brighter even if exposure is set low. The gradation correction can be performed by using a known tone curve correction, for example. By performing the gradation correction such that the dark portion becomes brighter, the image after performing the gradation correction generally becomes brighter, and the dark portion is easier to see.

The exposure has been controlled in step S202 such that the representative brightness of the highlight portion is matched with the target brightness, hence in the case of performing the gradation correction of a dark portion, the system control unit 113 increases the brightness of the dark portion such that the representative brightness of the highlight portion is not affected. Specifically, the system control unit 113 detects the bell shape of the histogram of the image on the higher brightness side, and does not perform the gradation correction for the pixels in the bell shape and the portion on the higher brightness side of the bell shape.

The bell shape on the higher brightness side may be a predetermined range (e.g. RL−β to RL+β), including the reference brightness RL (brightness at a position where the number of pixels is the maximum on the higher brightness side), for example. Further, the bell shape on the higher brightness side may be a region surrounded by the range from the edge of the histogram on the higher brightness side to the relative minimum value and the coordinate axis of the corresponding brightness.

The gradation correction for a dark portion may be executed only when the ratio of the black clipping region in the image is a predetermined ratio or more. This predetermined ratio may be set to an appropriate value in accordance with the image quality desired by the user.

Figure 10A:
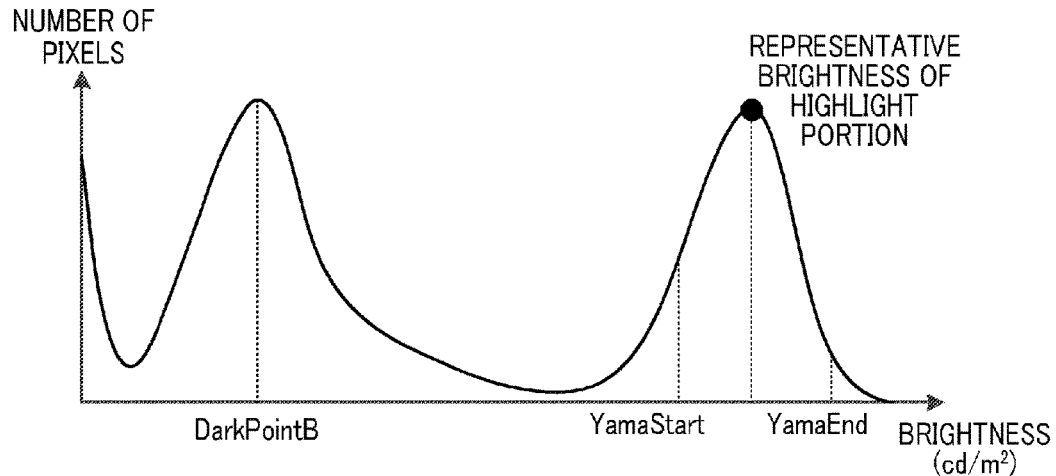
FIGS. 10A and 10B are diagrams for describing gradation correction of a dark portion.
Figure 10B:
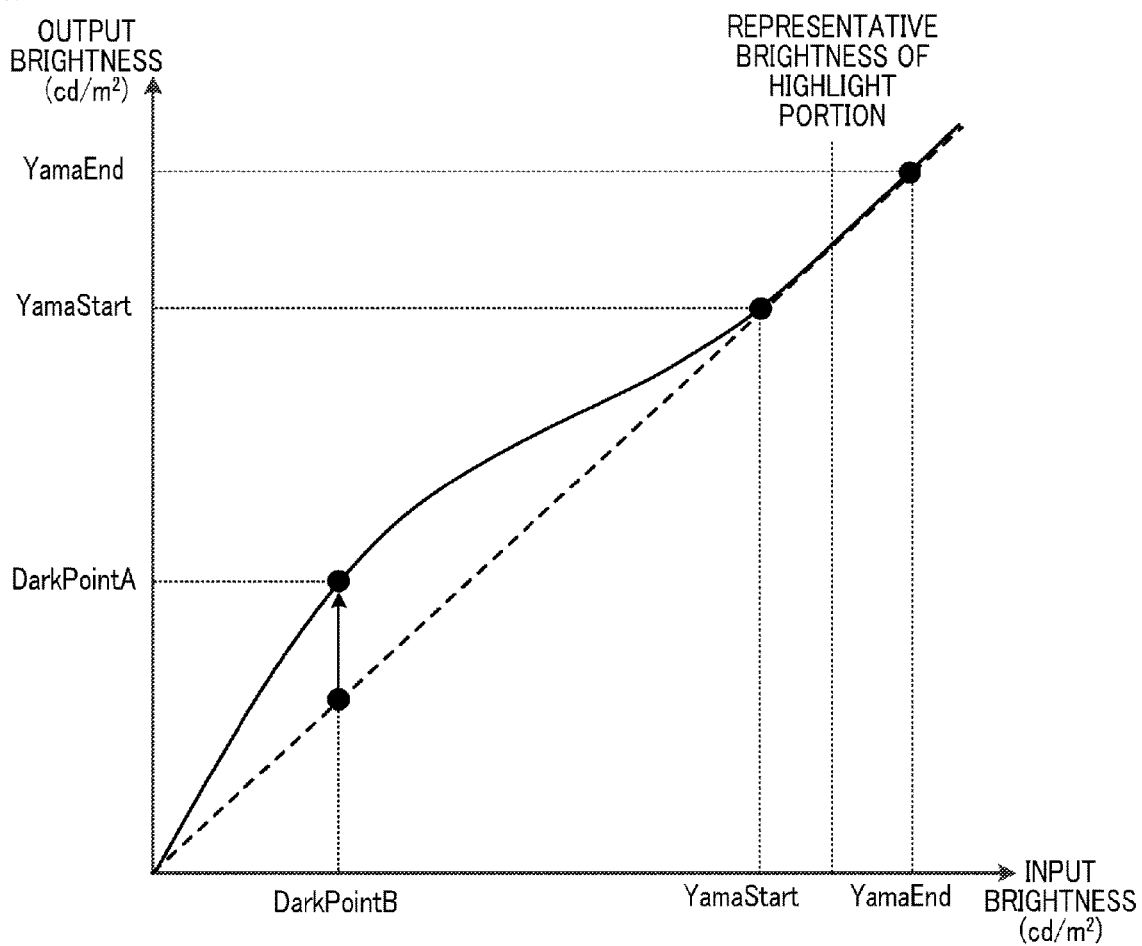

The gradation correction for a dark portion will now be described with reference to FIGS. 10A and 10B. FIG. 10A is a histogram after the representative brightness of the highlight portion is matched with the target brightness by controlling the exposure in step S202. In FIG. 10A, the bell shape on the higher brightness side has a range from YamaStart to YamaEnd, with the representative brightness of the highlight portion as the reference. In the histogram in FIG. 10A, a bell shape, where distribution of the pixels is concentrated, is also formed on the lower brightness side, and the dark portion of the image is in the black clipping state.

The system control unit 113 corrects the tone curve so as to correct the brightness of the dark portions, reducing the black clipping. FIG. 10B is an example of correcting the tone curve. The system control unit 113 detects the bell shape on the lower brightness side in the histogram, and acquires the position of the peak of the bell shape, the center of gravity of the bell shape, the position of the average brightness of the pixels included in the bell shape, and the like, as the dark portion brightness DarkPointB before correction. In FIG. 10B, the DarkPointB is set at the peak position of the bell shape on the lower brightness side.

A lookup table in which the dark portion brightness before correction (input brightness) and the dark portion brightness after correction (output brightness are corresponded) is provided in advance, and the system control unit 113 acquires the output brightness DarkPointA corresponding to the input brightness DarkPointB.

The tone curve is corrected, at the lower brightness side, to a curve passing through (0, 0), (DarkPointB, DarkPointA) and (YamaStart, YamaStart) by the spline interpolation, for example. [The correction] is not limited to the spline interpolation, and the tone curve may be corrected to a line graph connecting three points by lines.

On the higher brightness side, the tone curve is a line connecting the points of (YamaStart, YamaStart) and (YamaEnd, YamaEnd). The system control unit 113 performs the gradation correction to be brighter on the lower brightness side, without performing the gradation correction on the higher brightness side, whereby the lower brightness side can be corrected to be brighter with maintaining the brightness of the highlight portion.

The system control unit 113 may control the exposure such that the representative brightness on the higher brightness side does not exceed the target brightness in step S202, and may correct the exposure such that both the dark portion and the highlight portion become brighter in step S203. For example, the system control unit 113 corrects the tone curve to a curve passing through the points of (0, 0), (DarkPointB, DarkPointA) and (YamaEnd, YamaEnd) by the spline interpolation. In this case, the system control unit 113 can decrease the exposure such that the correction amount of the tone curve at the highlight portion is offset in step S202. For example, the system control unit 113 can control the exposure by adjusting the brightness change amount α in (Formula 1).

A case where the dynamic range of the image capturing scene has a predetermined number of steps or more and the target brightness is 1000 cd/m² will be described. When the target brightness is 1000 cd/m², the user may sense a dark portion that is relatively darker than actual darkness because of the brightness contrast effect. In the case where the target brightness is 1000 cd/m², it is preferable that the system control unit 113 sets the correction amount Dark of the dark portion to a value larger than the case of the target brightness 400 cd/m².

The dark portion correction amount from the reference target brightness is assumed to be DarkRef. Then if the reference target brightness is 400 cd/m², then DarkRef=DarkPointA−DarkPointB. When the target brightness is TargetLum and the dark portion correction magnification that is determined in accordance with TargetLum is F(TargetLum), the dark portion correction amount Dark with respect to TargetLum is given by (Formula 3).

$$\text{Dark} = \text{DarkRef} \times F(\text{TargetLum}) \quad \text{(Formula 3)}$$

A case where the dynamic range of an image capturing scene has less than a predetermined number of steps will be described. In a case where the dynamic range of the image capturing scene is less than a predetermined number of steps, the brightness and gradation property of the image are well maintained, even if the representative brightness of the highlight portion is matched with the target brightness. For example, in the case where the dynamic range has 5 steps, the maximum brightness is 400 cd/m², and the representative brightness is 350 cd/m², the gradation property is well maintained, even if the representative brightness of the highlight portion is matched with the target brightness. Hence if the dynamic range is less than a predetermined number of steps, the system control unit 113 may skip step S203.

According to the above embodiment, the digital camera 100 sets the target brightness based on the display brightness of the display device, and controls the exposure based on the representative brightness of the highlight portion and the target brightness, whereby brightness expression that utilizes the display brightness of the display device can be implemented.

According to the present disclosure, the brightness expression that utilizes the display brightness of the display device can be performed by controlling the exposure considering the brightness performance of the display device.

<Other Embodiments> Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-078367, filed on May 11, 2022, which is hereby incorporated by reference herein in its entirety.

What is claimed is:

1. An imaging apparatus comprising:
   at least one memory and at least one processor which function as a plurality of units comprising:
   (1) an acquisition unit configured to acquire a representative brightness of a high brightness region of an image;
   (2) a setting unit configured to set a target brightness of the high brightness region, based on a display brightness of a display device that displays the image;
   (4) an exposure control unit configured to control exposure based on the representative brightness and the target brightness of the high brightness region; and
   (5) a correction unit configured to perform gradation correction, based on the target brightness and a dynamic range of a scene in which the image has been captured,
   wherein the dynamic range is expressed by a number of steps, which increases in stages in accordance with a width of the dynamic range, and
   wherein the correction unit performs the gradation correction in a case where the dynamic range has a predetermined number of steps or more, and does not perform the gradation correction in a case where the dynamic range has less than a predetermined number of steps.

2. The imaging apparatus according to claim 1, wherein the target brightness is set based on an instruction by a user.

3. The imaging apparatus according to claim 1, wherein the target brightness is set based on the display brightness of the display device, acquired from the display device.

4. The imaging apparatus according to claim 1, wherein the target brightness is changed based on a brightness change amount in accordance with the display brightness of the display device.

5. The imaging apparatus according to claim 1, wherein in the case where the dynamic range has a predetermined number of steps or more, the correction unit performs the gradation correction such that a low brightness region of the image becomes brighter.

6. The imaging apparatus according to claim 5, wherein the correction unit performs the gradation correction not only for the low brightness region but also for the high brightness region, and
   wherein the exposure control unit controls to decrease the exposure so that the gradation correction for the high brightness region is offset.

7. The imaging apparatus according to claim 1, wherein the representative brightness of the high brightness region is a brightness at a position of a relative maximum value of a brightness histogram of the image on a higher brightness side, or a brightness at a center-of-gravity position of a region surrounded by a protruded portion of the brightness histogram on the higher brightness side.

8. The imaging apparatus according to claim 7, wherein the region surrounded by the protruded portion on the higher brightness side is a region surrounded by a range of the brightness histogram from an edge on the higher brightness side to a relative minimum value, and by a coordinate axis of a corresponding brightness.

9. The imaging apparatus according to claim 1, wherein the representative brightness of the high brightness region is a mean value of the brightness of pixels of which cumulative frequency in the brightness histogram of the image from the higher brightness side is a predetermined ratio or less, or a brightness at a center-of-gravity position of a region surrounded by a range in which the cumulative frequency in the brightness histogram of the image from the higher brightness side is a predetermined ratio or less, and by a coordinate axis of the corresponding brightness.

10. The imaging apparatus according to claim 1, wherein the acquisition unit divides the image into a plurality of blocks, and acquires a maximum value of a block brightness, which is a mean value, a maximum value, a minimum value, a median value, or a mode value of the brightness in each block, as the representative brightness of the high brightness region.

11. The imaging apparatus according to claim 1, wherein the representative brightness of the high brightness region is a mean value, a maximum value, a minimum value, a median value or a mode value of brightness in a region of a face of an object detected in the image.

12. A control method of an imaging apparatus, the control method comprising:
   acquiring a representative brightness of a high brightness region of an image;
   setting a target brightness of the high brightness region, based on a display brightness of a display device that displays the image;
   controlling exposure, based on the representative brightness and the target brightness of the high brightness region; and
   selectively performing gradation correction, based on the target brightness and a dynamic range of a scene in which the image has been captured,
   wherein the dynamic range is expressed by a number of steps, which increases in stages in accordance with a width of the dynamic range, and
   wherein in the selectively performing gradation correction, (1) the gradation correction is performed in a case where the dynamic range has a predetermined number of steps or more, and (2) the gradation correction is not performed in a case where the dynamic range has less than a predetermined number of steps.

13. A non-transitory computer-readable medium that stores a program for causing a computer to execute a control method of an imaging apparatus, the control method comprising:
   acquiring a representative brightness of a high brightness region of an image;
   setting a target brightness of the high brightness region, based on a display brightness of a display device that displays the image;
   controlling exposure, based on the representative brightness and the target brightness of the high brightness region; and
   selectively performing gradation correction, based on the target brightness and a dynamic range of a scene in which the image has been captured,
   wherein the dynamic range is expressed by a number of steps, which increases in stages in accordance with a width of the dynamic range, and
   wherein in the selectively performing gradation correction, (1) the gradation correction is performed in a case where the dynamic range has a predetermined number of steps or more, and (2) the gradation correction is not performed in a case where the dynamic range has less than a predetermined number of steps.

* * * * *